United States Patent
Chabak

(10) Patent No.: US 7,648,567 B2
(45) Date of Patent: Jan. 19, 2010

(54) TANK AND MATERIAL FOR STORAGE OF HYDROGEN GAS

(75) Inventor: Alexander Chabak, Moscow (RU)

(73) Assignees: C. EN. Limited, Aleman, Cordero, Galindo and Lee Trust (BVI) Limited, Tortola (VG); Moshe Stern, Hertzelia (IL)

(*) Notice: Subject to any disclaimer, the term of this patent is extended or adjusted under 35 U.S.C. 154(b) by 568 days.

(21) Appl. No.: 11/632,951

(22) PCT Filed: Oct. 27, 2005

(86) PCT No.: PCT/IL2005/001125

§ 371 (c)(1), (2), (4) Date: Jan. 19, 2007

(87) PCT Pub. No.: WO2006/046248

PCT Pub. Date: May 4, 2006

(65) Prior Publication Data

US 2008/0035200 A1 Feb. 14, 2008

(30) Foreign Application Priority Data

Oct. 27, 2004 (RU) ............................. 2004131361
Feb. 3, 2005 (RU) ............................. 2005102577

(51) Int. Cl.
*B01D 59/26* (2006.01)
(52) U.S. Cl. .................. 96/108; 156/62.2; 207/0.7; 420/900; 423/658.2; 502/526
(58) Field of Classification Search ............... 96/108; 156/62.2; 502/526; 420/900; 423/658.2; 206/0.7

See application file for complete search history.

(56) References Cited

U.S. PATENT DOCUMENTS

| 4,302,217 A | 11/1981 | Teitel |
| 4,328,768 A | 5/1982 | Tracy et al. |
| 4,457,136 A | 7/1984 | Nishizaki et al. |
| 5,002,730 A * | 3/1991 | Fetcenko .................. 420/424 |
| 5,036,031 A | 7/1991 | Patterson |
| 5,128,175 A * | 7/1992 | Yamanishi et al. .......... 427/515 |
| 6,746,496 B1 * | 6/2004 | Kravitz et al. .............. 48/118.5 |

FOREIGN PATENT DOCUMENTS

GB 2 015 142 9/1979

(Continued)

OTHER PUBLICATIONS

Abstract of RU 2037737, V. Z. Mordkovich, "Hydrogen Accumulating Apparatus", Date of Publication Jun. 19, 1995.

(Continued)

*Primary Examiner*—Robert J Hill, Jr.
*Assistant Examiner*—Christopher P Jones
(74) *Attorney, Agent, or Firm*—Browdy & Neimark, PLLC

(57) ABSTRACT

A hydrogen accumulation and storage material and a method of forming thereof are provided. The material comprises a plurality of various-sized and at least partially permeable to hydrogen microspheres bound together to form a rigid structure in which a diameter of the microspheres is reduced from a center of the structure towards edges of the structure. An outer surface of the rigid structure can be enveloped by a sealing layer, thereby closing interspherical spaces.

34 Claims, 3 Drawing Sheets

FOREIGN PATENT DOCUMENTS

| GB | 1 581 639 | 12/1980 |
|---|---|---|
| RU | 2 038 525 C1 | 6/1995 |
| RU | 2 049 923 C1 | 12/1995 |
| RU | 2 222 749 C2 | 1/2004 |
| RU | 2 267 694 C2 | 1/2006 |
| RU | 2 283 453 C2 | 9/2006 |
| SU | 670 774 | 6/1979 |
| SU | 1204645 | 1/1986 |
| SU | 1 818 503 A1 | 5/1993 |
| SU | 1 207 087 A1 | 3/1998 |
| SU | 1 332 724 A1 | 3/1998 |
| WO | WO 2004/027901 A2 | 4/2004 |

OTHER PUBLICATIONS

A. A. Akunets et al., "Superdurable Microballons for Hydrogen Storage", Journal Of Optics Research, vol. 4, No. 2/3, 1996, pp. 181-202.

A. A. Akunets et al., "Super-High-Strength Microballons for Hydrogen Storage", International Journal Of Hydrogen Energy, vol. 19, No. 8, 1994, pp. 697-700.

R. Zidan et al., "Study Of Chemically Synthesized Mg-Mgh2 for Hydrogen Storage", International Journal Of Hydrogen Energy, Elsevier Science Publishers B.V., Barking, GB, vol. 16, No. 12, Jan. 1991, pp. 821-827.

B. Duret et al., "Microspheres For On-Board Hydrogen Storage", International Journal of Hydrogen Energy, Elsevier Science Publishers B.V., Barking, GB, vol. 19, No. 9, Sep. 1, 1994, pp. 757-764.

A. Schwartz, (Kirkland, Washington) "Car of Future", Vestnik Online, No. 10(347) May 12, 2004.

Malyshenko And O.V. Nazarova, "Hydrogen Accumulation" published in Nuclear and Hydrogen Energetics and Technology (in Russian), Issue 8, pp. 155-205, 1988.

* cited by examiner

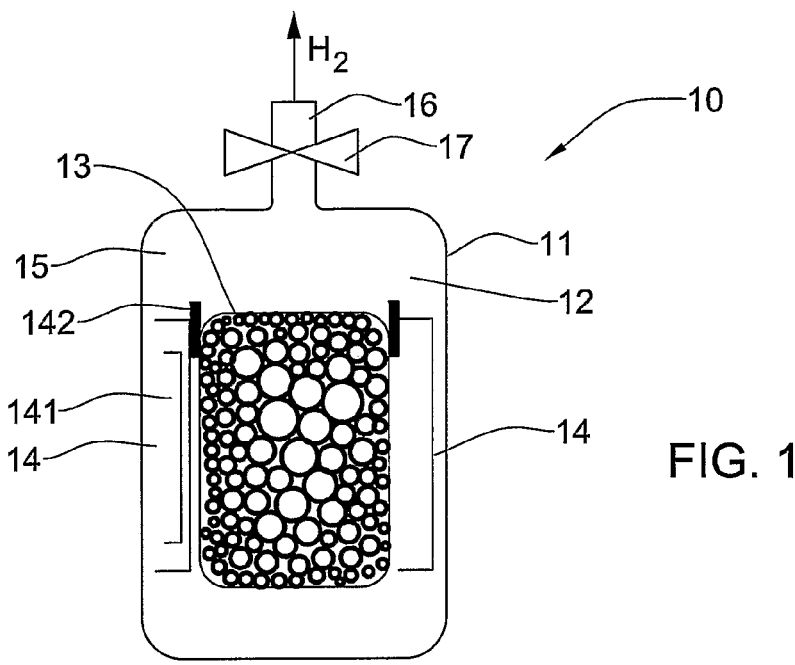
FIG. 1
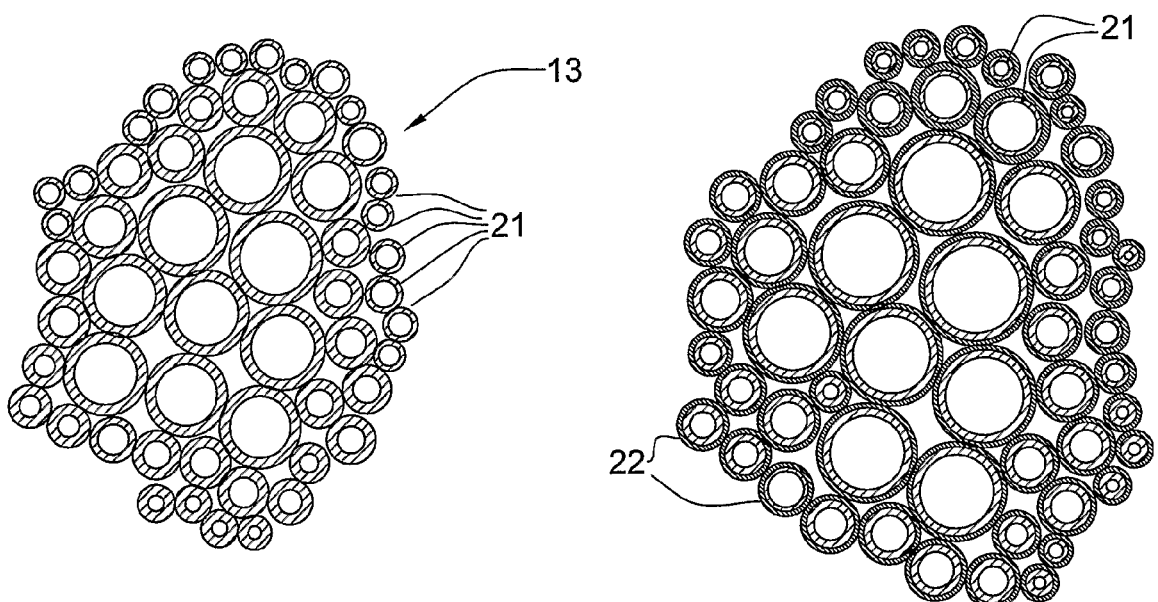
FIG. 2A
FIG. 2B
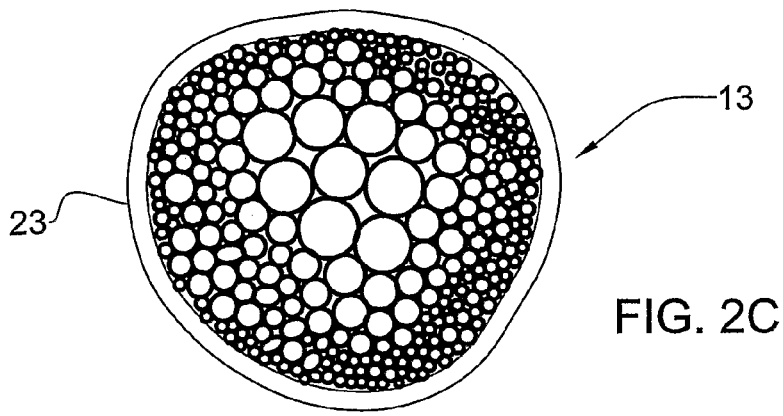
FIG. 2C

TANK AND MATERIAL FOR STORAGE OF HYDROGEN GAS

FIELD OF THE INVENTION

The present invention relates generally to fuel storage, and in particular, to accumulation and storage of hydrogen gas.

BACKGROUND OF THE INVENTION

It is well-known that hydrogen is a very efficient and clean-burning fuel. Hydrogen can be combined with oxygen through combustion, or through fuel cell mediated oxidation/reduction reactions, to, produce heat, or electrical power. The primary product of this reaction is water, which is non-polluting and can be recycled to regenerate hydrogen and oxygen.

Currently, hydrogen energetics is the focus of interest in nuclear industry, motor transport, auto industry, chemical industry, aerospace industry, portable power sources industry (cellular phones, computers, home appliances), etc. In particular, the transport sector is a consumer of about half of the world's crude oil production. Therefore, this sector of the economy is intensively adopting the use of hydrogen fuel. This would solve environmental problems, especially in large megapolises and industrial regions.

One of the problems of hydrogen energetics is safe storage and delivery of hydrogen fuel to a combustion -cell. Most generally, hydrogen is stored either in liquid form or as a gas under pressure in a large vessel. Liquid storage systems require significant insulation so that the liquid state can be maintained while gas storage systems require large and heavy vessels.

Existing accumulation techniques with compressed gaseous hydrogen in tanks provide a relatively low hydrogen weight content (the ratio of the weight of hydrogen in accumulator to the weight of accumulator), i.e., up to 10 weight %, and there are certain restrictions for further growth of this parameter along with low explosion protection. Hydrogen can be stored as a liquid, if cooled down to $-253°$ C. (up to 7.1 weight %). However, about one third of hydrogen energy (11 kW•hour/kg $H_2$) is consumed to reach this temperature, while hydrogen evaporation losses can reach 3-5% daily.

For example, hydrogen accumulators and hydrogen accumulation methods based on solid bonding of hydrogen (e.g., in metal hydrides or sorption on dispersed nanomaterials) are known in the art (see, for example, Russian Federation Pat. Nos. 2037737 and 2038525). These hydrogen accumulation and storage devices are relatively explosion-proof, because hydrogen features no excess pressure. However, these techniques are inertial, and it takes time for them to start working (several minutes). Moreover, hydrogen absorption and release consume a lot of heat. Likewise, weight content of hydrogen is rather low (about 4.5%). Weight content is a function of the volume of hydrogen in accumulating agent, and specific weight of the accumulating agent.

A hydrogen storage tank is described in Russian Federation Pat. No. 2222749 that includes a sealed housing that accommodates an internal liquefied hydrogen storage vessel, and a gas filling system allowing lower hydrogen losses and filing duration. This tank is made of relatively light heavy-duty composite materials. According to estimation, such a tank can store about 3.2 kg of hydrogen, and the weight hydrogen content is therefore equal to 8%. The main drawbacks of this tank are related to explosion hazards, relatively low hydrogen content per vessel volume unit, and gas losses due to-gas release from the tank.

U.S. Pat. No. 4,328,768 describes a fuel storage and delivery system wherein hollow microspheres filled with hydrogen gas are stored in a fuel storage chamber at pressures of 400 atm from which the microspheres are directed through a heated delivery chamber wherein hydrogen gas is freed by diffusion and delivered to an engine, after which the substantially emptied microspheres are delivered to a second storage chamber. The substantially emptied microspheres are removed by mechanical means, such as a pump, to a storage chamber from which they can be removed for refilling.

A hydrogen accumulation in hollow 5-200 μm glass microspheres with 0.5-5 μm walls is described by S. P. Malyshenko and O. V. Nazarova. (see a paper titled: "Hydrogen Accumulation" published in <<Nuclear and hydrogen energetics and technology>> (in Russian), issue 8, PP. 155-205, 1988). When under pressure at 200° C.-400° C., hydrogen diffuses intensely through the walls, fills in the microspheres and remains there under pressure after cooling. When heating the microspheres to the above temperatures at ambient hydrogen pressure of 500 atm, hydrogen weight content in the microspheres reaches 5.5%-6.0%. The hydrogen weight content can be even lower, if the ambient hydrogen pressure is lower. On heating to 200° C., about 55% of hydrogen contained in microspheres will be released. Accordingly, about 75% of hydrogen contained in microspheres will be released on heating to 250° C. At hydrogen storage in glass microspheres, its wall diffusion losses are about 0.5% per 24 hours. In the case when the microspheres are coated with metal films, diffusion losses of hydrogen at room temperatures can be 10 to 100 times lower. The main drawback of this method is in the fact that the microspheric accumulator cannot be charged at very high hydrogen pressures and high temperatures, because it makes the process hazardous due to the low tensile strength of glass, which is within 20 kg/mm$^2$. This does not allow hydrogen weight content in the microspheres to be substantially higher than 6% (by weight).

SUMMARY OF THE INVENTION

Despite the known techniques in the area of accumulation and storage of hydrogen, there is still a need in the art for further improvement in order to provide a safe hydrogen storage tank that can operate at lower pressure and temperature at hydrogen accumulation and storage stages, higher weight content of hydrogen, and lower losses of hydrogen on storage and accumulation, which will result in increased safety and cost-saving.

It would be advantageous to have hydrogen accumulation and storage material whose hydrogen weight content would be higher than 6% w.

According to one general aspect, the present invention partially eliminates disadvantages of the prior art techniques and provides a novel hydrogen accumulation and storage material comprising a plurality of various-sized and at least partially permeable to hydrogen microspheres bound together to form a rigid structure in which a diameter of the microspheres is reduced from a center of the structure towards edges of the structure.

The term 'microsphere' in the present specification and claims broadly refers to a hollow microvessel having a closed volume of any shape. In case when the shape of the microvessel is not spherical, the term 'diameter' refer to its maximal dimension.

The diameter of the microspheres can be in the range of 5 microns to 5000 microns. The ratio of the wall thickness of the microspheres to their diameter can be less than or equal to 0.5.

According to an embodiment of the invention, the rigid structure is made of a plurality of zones, each zone including microspheres having predetermined size.

The microspheres can be made of electrically conductive material. Examples of the material of such microspheres include, but are not limited to, graphite-based composites, steel, titanium, lanthanum, nickel, zirconium and alloys thereof.

The microspheres can be bound together by at least one process selected from welding, sintering or gluing.

According to another embodiment of the invention, an outer surface of the microspheres can be at least partially coated with a hydrogen absorbing layer. The hydrogen absorbing layer can be made of electrically conductive material. Examples of the material suitable for the hydrogen absorbing layer include, but are not limited to, palladium, nickel and lanthanum-nickel alloys. The coating can be formed by at least one coating process selected from chemical vapor deposition, electroplating, electroless plating, sol gel, plasma-activated chemical vapor deposition, sputtering, and painting.

According to a further embodiment of the invention, an outer surface of the rigid structure is enveloped by a sealing layer, thereby closing interspherical spaces. The material of the sealing layer is made of a hydrogen absorbing metal selected from at least one of palladium, nickel and lanthanum-nickel alloys.

The material of the invention is such that a pressure of the hydrogen stored within the the microspheres can be better than 1000 atm.

According to another general aspect of the invention, there is provided a tank for accumulation and storage of hydrogen comprising:

a sealed housing defining a chamber;

a hydrogen accumulation and storage material of the present invention arranged within the chamber; and an internal heat exchanger configured for controllably varying the temperature of said hydrogen accumulation and storage material, thereby providing a controllable release of the hydrogen stored within the material into a volume of the chamber that is not occupied by the material.

For example, pressure of the hydrogen stored within the volume can be in the range of 5 atm to 10 atm.

The tank also includes an outlet pipe having a valve for controllable discharge of the hydrogen from the chamber.

According to an embodiment of the invention, the internal heat exchanger includes an electrically heating element. The internal heat exchanger can include a pair of electrodes configured for coupling the material to an electric power source.

Likewise, the internal heat exchanger includes a system of heat conductive pipes through which a flow of a fluid having a predetermined temperature can be provided.

The tank according to the present invention is of durable and reliable construction. Moreover, the tank according to the present invention may have a low manufacturing cost.

According to yet another general aspect there is provided a method of forming a hydrogen accumulation and storage material, comprising:

providing a plurality of various-sized and at least partially permeable to hydrogen microspheres;

arranging the microspheres such that a structure is formed in which a diameter of the microspheres is reduced from a center of the structure towards edges of the structure;

bounding the microspheres together to make the structure rigid.

The bounding of the microspheres together can include at least one process selected from welding or sintering.

According to an embodiment of the invention, the method further includes the step of coating the microspheres with a hydrogen absorbing layer.

According to an embodiment of the invention, the method includes enveloping an outer surface of the rigid structure by a sealing layer, thereby closing interspherical spaces.

According to still a further general aspect of the invention, there is provided a method of filling a hydrogen accumulation and storage material of the present invention with hydrogen. The method comprises:

placing the material in hydrogen-containing medium;

transforming hydrogen in ionic form;

providing a motion of the ionic hydrogen towards the material by an electric field.

According to an embodiment of the present invention, the transforming of the hydrogen in ionic form is carried out by an electrolysis process in water solutions.

According to another embodiment of the present invention, the transforming of the hydrogen in ionic form is carried out by an electric discharge process.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to understand the invention and to see how it may be carried out in practice, preferred embodiments will now be described, by way of non-limiting examples, only, with reference to the accompanying drawings, in which:

FIG. 1 is a schematic cross-sectional view of a tank for accumulation and storage of hydrogen, according to one embodiment of the present invention;

FIG. 2A is a schematic view of a hydrogen accumulation and storage material, according to one embodiment of the present invention;

FIG. 2B is a schematic view of a hydrogen accumulation and storage material, according to another embodiment of the present invention;

FIG. 2C is a schematic view of a hydrogen accumulation and storage material, according to yet another embodiment of the present invention;

DETAILED DESCRIPTION OF SPECIFIC EMBODIMENTS

Figure 3:
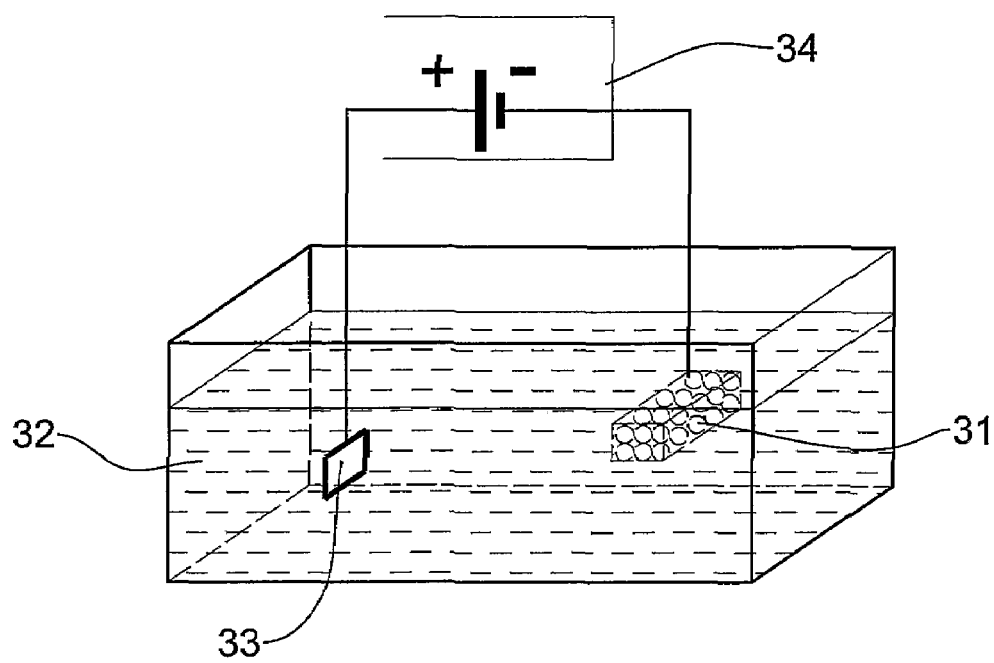
FIG. 3 is a schematic illustration of a system for filling the microspheric material shown in FIGS. 2A-2B with hydrogen from water solution of a hydrogen-containing medium.

The principles and operation of a tank and material for storage hydrogen gas according to the present invention may be better understood with reference to the drawings and the accompanying description. It should be understood that these drawings are given for illustrative purposes only and are not meant to be limiting. The same reference numerals and alphabetic characters will be utilized for identifying those components which are common in the tank structure and its components shown in the drawings throughout the present description of the invention.

Referring to FIG. 1, a schematic cross-sectional view of a tank 10 for accumulation and storage of hydrogen gas is illustrated, according to one embodiment of the present invention. The tank 10 includes a sealed housing 11 defining a chamber 12 which contains a hydrogen accumulation and storage material 13. The tank 10 further includes an activator 14 configured for control of diffusion rate of hydrogen permeability through the storage material 13.

According to an embodiment of the invention, the activator 14 is an internal heat exchanger configured for controllably varying the temperature of the hydrogen accumulation and storage material 13, thereby providing a controllable release of the hydrogen stored at very high pressures within the material 13 into a volume 15 of the chamber 12 that is not occupied by the material 13 in which the hydrogen is stored at a moderate pressure. For example, the pressure of the hydrogen stored within the material 13 can be better than 1000 atm (e.g., in the range of 1000 atm-3000 atm), whereas the pressure of the hydrogen stored within the volume 15 can be in the range of 5 atm-10 atm. Examples of the material suitable for the housing 11 include, but are not limited to, graphite-based composites, ceramics, polymers, etc. The tank 10 also includes an outlet pipe 16 arranged with a valve 17 for controllable discharge of gaseous hydrogen from the chamber 12. The hydrogen can be used as a fuel or as a raw material in reactions desired by a user.

According to an embodiment of the invention, the internal heat exchanger 14 includes an electrically heating element 141 coupled to an electric power source (not shown). Electrically heating elements are known per se, and they can heat the material 13 in a well-known manner.

According to another embodiment of the invention, when the material 13 is electrically conductive, the internal heat exchanger 14 can include a pair of electrodes 142 configured for coupling the material 13 itself to an electric power source (not shown). In such a case, when an electric voltage is applied across the conductive material 13, an electric current passing through the material 13 is produced for heating thereof.

According to yet an embodiment of the invention, the internal heat exchanger 14 can include a system of heat conductive pipes (not shown) through which a flow of a fluid having a predetermined temperature can be provided for controllably varying the temperature of the hydrogen accumulation and storage material 13.

Referring to FIG. 2A, a schematic view of the hydrogen accumulation and storage material 13 is illustrated, according to one embodiment of the present invention. It should be noted that this figure as well as further figures (illustrating other examples of the material of the present invention) are not to scale, and are not in proportion, for purposes of clarity.

The hydrogen accumulation and storage material includes a plurality of various-sized and at least partially permeable to hydrogen microspheres 21 bound together to form a rigid structure. According to this embodiment, a diameter of the microspheres 21 is reduced from a center of the structure towards edges of the structure. It should be understood that the hydrogen accumulation and storage material 13 can be of any desired shape. In particular, it can take the shape of the chamber (12 in FIG. 1) of the tank (10 in FIG. 1) for accumulation and storage of hydrogen gas.

It has been found by the inventors that whenever microspheres are saturated with hydrogen to the same pressure, e.g., 2000 atm, the tensions developed in the wall of the microspheres will vary. These tensions are 30 kg/mm$^2$ for 5 μm microspheres, 55 kg/mm$^2$ for 10 micrometers (μm) microspheres, and 80 kg/mm$^2$ for 15 μm microspheres. Considering that the use of microspheres imposes major restrictions on hydrogen pressure in microspheres, and that the inter-microsphere space is not utilized, creation of the microporous rigid structure can be efficient. Thus, according to an embodiment of the invention, a rigid microspheric layered structure is formed. By placing larger microspheres inside this rigid structure and smaller microspheres towards the edges, a hydrogen accumulation and storage material is created which can feature a high hydrogen content and good strength properties.

The microspheres can be made of electrically conductive material. Examples of the electrically conductive material suitable for the purpose of the present invention include, but are not limited to, graphite-based composites, conductive ceramics, steel, titanium, lanthanum, nickel, zirconium and alloys thereof.

When the microspheres are made of metal, they can be bound together, for example, by welding. In turn, when the microspheres are made of graphite-based composites or ceramics, they can be bound together, for example, by sintering. Likewise, an adhesive material, such as glue, can also be used for binding the microspheres.

The microspheres can have a diameter in the range of 1 micron to 5000 microns. The wall thickness of the microspheres can vary in the range of 0.1 microns to 100 microns. Preferably, the ratio of the wall thickness of the microspheres to the diameter is less than or equal to 0.5.

For example, the material including microspheres in the range of 1 micron to 50 microns with the walls thickness of about 1 micron can be used. The material can be made of high-strength conducting materials having breaking point $\sigma_{Bp}$ higher than 70 kg/mm$^2$. Examples of the suitable materials include, but are not limited to, steel, titanium, lanthanum, nickel, zirconium and/or their alloys, graphite and/or graphite-based composites.

Referring to FIG. 2B, a schematic view of a hydrogen accumulation and storage material 13 is illustrated, according to another embodiment of the present invention. According to this embodiment, an outer surface of the microspheres is at least partially coated with a hydrogen absorbing layer 22. It should be noted that thickness of walls of the microspheres 21 and the thickness of the layer 22 are not in proportion, for purposes of clarity.

Preferably, the hydrogen absorbing layer 22 is made of electrically conductive material. Examples of electrically conductive material suitable for the hydrogen absorbing layer include, but are not limited to, palladium, nickel, lanthanum-nickel alloys, etc. The hydrogen absorbing layer can be formed by any known technique, such as chemical vapor deposition, electroplating, electroless plating, sol gel, plasma-activated chemical vapor deposition, sputtering, and painting. For example, a thickness of the hydrogen absorbing layer can be in the range of about half-micron to about tens of microns, depending on the microsphere sizes.

It should be noted that when the microspheres are bound together by means of electrically conductive material, passage of electric current through the structure can provide the heating required for release of hydrogen from the material.

Hydrogen pressure in the microspheres 21 of the material of FIGS. 2A and 2B can reach thousands gauge atmospheres. For example, 10 microns microspheres with about 1 micron walls thickness made of 30x steel ($\sigma_{0,2}$=75 kg/mm$^2$, $\sigma_{Bp}$=90 kg/mm$^2$) can withstand pressures up to 3000 atm, where $\sigma_{0,2}$ is the yield point, kg/mm$^2$; $\sigma_{Bp}$ is the breaking point, kg/mm$^2$.

Since $\sigma_\phi = PR_S/2S$ and $\sigma_R = P/2$, where $\sigma_\phi$ is the tangential stress on a microsphere wall, kg/mm$^2$; P is the hydrogen pressure in a microsphere, kg/mm$^2$; $R_S$ is the microsphere radius, as measured to the midpoint of the wall, mm; S is the wall thickness, mm; $\sigma_R$ is radial stress on a microsphere wall, kg/mm$^2$. Then $\sigma_{100} = 67.5$ kg/mm$^2$, $\sigma_R = -15$ kg/mm$^2$, and $\sigma_\phi - \sigma_R = 82.5$ kg/mm$^2$.

The volume of hydrogen in a liter of such material with 3000 atm pressure in the microspheres is 1000 liters. This is about 2.5 times as high as that in the prototype at 400 atm.

The ratio between the wall volume to the hydrogen volume relationship can vary depending on the size of the microspheres, but this results in changing hydrogen pressure that a microsphere can withstand. According to calculations, hydrogen volume grows proportionate to increase in diameter, however the pressure, which a microsphere can withstand, drops.

Table 1 shows calculated dependencies between hydrogen content in the microspheres and their diameter, for EP-222 steel $\sigma_{0,2} = 37$ kg/mm$^2$, $\sigma_{Bp} = 70$ kg/mm$^2$).

TABLE 1

| Microspheres diameter, μm. | Hydrogen content in 1 l material, g/l | $\sigma_\phi - \sigma_R$, kg/mm$^2$ | Hydrogen pressure in microsphere, gauge atm |
|---|---|---|---|
| 10.0 | 52.8 | 68.75 | 2500 |
| 9.0 | 51.2 | 62.50 | 2500 |
| 8.0 | 59.4 | 67.5 | 3000 |
| 7.0 | 62.7 | 70.0 | 3500 |
| 6.0 | 64.0 | 70.0 | 4000 |
| 5.0 | 66.0 | 67.5 | 4500 |
| 4.0 | 69.3 | 68.75 | 5500 |

For the steel with $\sigma_\phi - \sigma_R = 150$ kg/mm$^2$, hydrogen content grows proportionally (see Table 2).

TABLE 2

| Microspheres diameter, μm. | Hydrogen content in 1 l material, g/l | $\sigma_\phi - \sigma_R$, kg/mm$^2$ | Hydrogen pressure in microsphere, gauge atm |
|---|---|---|---|
| 10.0 | 67.3 | 137.5 | 5000 |
| 9.0 | 72.6 | 150 | 6000 |
| 8.0 | 75.9 | 146.25 | 6500 |
| 7.0 | 79.2 | 140 | 7000 |

Tables 3-6 show hydrogen content as a function of microspheres pressure for various microsphere diameters.

TABLE 3

(5 μm diameter and 1 μm wall thick microspheres)

| Hydrogen pressure in microsphere, gauge atm | $\sigma_\phi - \sigma_R$, kg/mm$^2$ | Hydrogen content in 1 l of material, g/l | Hydrogen content in 90 l of material, g |
|---|---|---|---|
| 1000 | 15 | 7.0 | 630 |
| 2000 | 30 | 9.8 | 882 |
| 3000 | 45 | 12.6 | 1134 |
| 4000 | 60 | 13.6 | 1224 |
| 5000 | 75 | 14.3 | 1287 |
| 6000 | 90 | 15.4 | 1386 |
| 7000 | 106 | 16.8 | 1512 |

TABLE 4

(8 μm diameter and 1 μm wall thick microspheres)

| Hydrogen pressure in microsphere, gauge atm | $\sigma_\phi - \sigma_R$, kg/mm$^2$ | Hydrogen content in 1 l of material, g/l | Hydrogen content in 90 l of material, g |
|---|---|---|---|
| 1000 | 22.5 | 14.0 | 1260 |
| 2000 | 45.0 | 19.6 | 1764 |
| 3000 | 67.5 | 25.2 | 2268 |
| 4000 | 90.0 | 27.2 | 2430 |
| 5000 | 112.5 | 28.6 | 2574 |
| 6000 | 135.0 | 30.8 | 2772 |
| 7000 | 157.5 | 33.6 | 3024 |

TABLE 5

(10 μm diameter and 1 μm wall thick microspheres)

| Hydrogen pressure in microsphere, gauge atm | $\sigma_\phi - \sigma_R$, kg/mm$^2$ | Hydrogen content in 1 l of material, g/l | Hydrogen content in 90 l of material, g |
|---|---|---|---|
| 1000 | 27.50 | 16.8 | 1512 |
| 2000 | 55.00 | 23.6 | 2124 |
| 2500 | 67.75 | 26.9 | 2421 |
| 3000 | 82.50 | 30.3 | 2727 |
| 4000 | 110.00 | 32.7 | 2943 |
| 4500 | 123.75 | 33.7 | 3033 |
| 5000 | 137.5 | 34.3 | 3087 |
| 6000 | 165.0 | 37.0 | 3330 |
| 7000 | 192.5 | 40.4 | 3636 |

TABLE 6

(15 μm diameter and 1 μm wall thick microspheres)

| Hydrogen pressure in microsphere, gauge atm | $\sigma_\phi - \sigma_R$, kg/mm$^2$ | Hydrogen content in 1 l of material, g/l | Hydrogen content in 90 l of material, g |
|---|---|---|---|
| 1000 | 40.0 | 21.5 | 1935 |
| 2000 | 80.0 | 30.1 | 2709 |
| 3000 | 120.0 | 38.7 | 3483 |
| 4000 | 160.0 | 41.7 | 3753 |
| 5000 | 200.0 | 43.9 | 3951 |
| 6000 | 240.0 | 47.3 | 4257 |

As seen from Tables 3-6, filling of various microspheres with hydrogen to the same pressure (e.g. 2,000 gauge atm) is associated with various tensions in the microsphere wall. In particular, these tensions are 30 kg/mm$^2$, 45 kg/mm$^2$, 55 kg/mm$^2$, and 80 kg/mm$^2$ for 5 micrometers (μm), 8 micrometers, 10 microns, and 15 micrometers microspheres, respectively. Therefore, by placing microspheres (by pressing in or welding) into the storage tank so that their diameter is reduced from the center towards the edges, one can obtain an accumulation and storage material in which the wall tensions decreasing towards the circumference due to lower diameter of the microspheres. The tension drops due to the contact of the walls (a double thick wall is obtained with hydrogen pressure on both sides basically equal), which reduces the risk of rupture of the microspheres and the entire tank.

Table 7 shows hydrogen weight content as a function of hydrogen pressure in the microspheres for the following three materials: steel with d=8 g/cm$^3$, titanium with d=4.5 g/cm$^3$, graphite with d=2.25 g/cm$^3$, respectively, where: d is the specific weight of material, g/cm$^3$.

TABLE 7

| Diameter of microsphere | Hydrogen weight content in steel, titanium, and graphite microspheres at various pressures (gauge atm), %. | | | | | | | | | |
|---|---|---|---|---|---|---|---|---|---|---|
| μm | 1000 | 2000 | 3000 | 4000 | 5000 | 6000 | 7000 | 8000 | 9000 | $10^4$ |
| 5.0 | 0.3 | | | | | | | | | 3.1 |
| | 0.55 | | | | | | | | | 5.5 |
| | 1.1 | | | | | | | | | 11.28 |
| 8.0 | 0.8 | 1.6 | 2.4 | 3.2 | 4.0 | 4.8 | 5.6 | 6.4 | 7.2 | 8.0 |
| | 1.45 | 2.9 | 4.35 | 5.8 | 7.25 | 8.7 | 10.2 | 11.6 | 13.0 | 14.5 |
| | 2.9 | 5.8 | 8.7 | 11.6 | 14.5 | 17.5 | 20.4 | 23.2 | 26.0 | 29.0 |
| 10.0 | 1.18 | 2.36 | 3.54 | 4.72 | 5.90 | 7.08 | 8.26 | 9.44 | | |
| | 2.10 | 4.20 | 6.30 | 8.40 | 10.5 | 12.6 | 14.70 | 16.8 | | |
| | 4.16 | 8.32 | 12.48 | 16.64 | 20.8 | 24.96 | 29.12 | 33.28 | | |
| 15.0 | 2.11 | 4.22 | 6.33 | 8.44 | 10.55 | 12.66 | | | | |
| | 3.7 | 7.4 | 11.1 | 14.8 | 18.5 | 22.2 | | | | |
| | 7.4 | 14.8 | 22.2 | 29.6 | 37.0 | 44.4 | | | | |
| 20.0 | 3.06 | 6.12 | 9.18 | 12.24 | | | | | | |
| | 5.34 | 10.68 | 16.0 | 21.34 | | | | | | |
| | 10.68 | 21.36 | 32.0 | 42.72 | | | | | | |
| 50.0 | 8.57 | | | | | | | | | |
| | 15.23 | | | | | | | | | |
| | 30.5 | | | | | | | | | |

As can be seen from Tables 5 and 7, hydrogen weight content as high as 6% can be provided in the accumulation and storage material with 15 μm microspheres, by using $\sigma_{Bp} \geq 120$ kg/mm$^2$ steel or $\sigma_{Bp} \geq 80$ kg/mm$^2$ titanium or $\sigma_{Bp} \geq 40$ kg/mm$^2$ graphite.

All above calculations and tests are supportive to the possibility of providing an economically sound hydrogen weight content with 5-50 μm diameter and 1 μm walls microspheres for a broad range of high-strength metals, alloys, and composites.

The permeability of the wall of the microspheres to hydrogen can be controllably altered by pressure and/or temperature. According to one embodiment of the invention, the hydrogen accumulation and storage material 13 can be filled with hydrogen gas by placing the material 13 in high temperature and pressure environment. As is known, the gas will diffuse through the walls of the microspheres inside the hollow microspheres at a rate which increases with increasing pressure and/or temperature. In such a case, each microsphere 21 acts as a small-volume high-pressure containment vessel. After the accumulation of the hydrogen gas, the material 13 can be cooled down under the high pressure, and then the pressure can be decreased or maintained at the same magnitude as inside the microspheres.

According to this embodiment, the filling of the hydrogen accumulation and storage material 13 is carried out in an autoclave that withstands high pressure and has a heating system. First, the autoclave is vacuumed, for example, by a vacuum booster pump to remove air, following which it is fed with hydrogen gas to a small excess pressure (about 1-3000 atm). Afterwards, the autoclave is heated to a temperature in the range of 300° C.-500° C. (depending on the material of the microspheres). The rigid structure is maintained under these parameters, until hydrogen pressures in the autoclave and inside the rigid structure equalize due to hydrogen diffusion. Then, the system is cooled down to the room temperature at the same excess pressure. By maintaining the hydrogen accumulation and storage material 13 at relatively low ambient temperatures, e.g., at 24° C., the amount of hydrogen gas escaping from the microspheres will be minimal, so that the gas can be stored within the material 13 during the long time period. Then, the hydrogen pressure in the autoclave can be dropped, and the material can be removed from the autoclave and placed in the chamber (12 in FIG. 1) of the tank (10 in FIG. 1). Once the internal heat exchanger 14 is activated to maintain the temperature in the range of 250° C.-350° C., hydrogen will start to release from the material 13 to the chamber (12 in FIG. 1). When required, the hydrogen gas can be delivered to the consumer via the outlet pipe 16.

It should be understood that when required the tank 10 itself can be placed in an autoclave for filling the microspheric material 13. In such a case, the outlet pipe 16 of the tank should be opened in order to provide access of the hydrogen gas to the material 13. It should be understood that when required, an additional one or several openings can be provided to facilitate such access.

According to another embodiment of the present invention, the filling of the hydrogen accumulation and storage material 13 is carried out in ionic form.

Referring to FIG. 3, a schematic illustration of a system for filling a microspheric material 31 with hydrogen from water solution of a hydrogen-containing medium is illustrated. The microspheric material 31 can be placed in an electrolyte solution 32, e.g., a water solution of sulfuric acid, hydrazine-hydrate, etc. Thereafter, a negative potential from a power source 34 is applied to the material 31 (which acts as a cathode electrode), whereas an electrode 33 with a positive potential (anode) is introduced into the solution 32. As can be understood, when a voltage (e.g., higher than 2V) is applied to the system, the hydrogen converted into ionic form by electrolysis will fill the internal space of the microspheres.

The essence of the present invention can be better understood from the following non-limiting specific Examples 1-4 of the microspheric material for accumulation and storage of hydrogen gas, and method of filling the microspheric material with hydrogen. These examples are intended to illustrate the present invention and to teach a person of the art how to make and use the invention. It should be understood that these examples are not intended to limit the scope of the invention or its protection in any way.

EXAMPLE 1

EI-647 steel 10 μm granules of microspheres in the volume of 2 ml were hydrogen-filled at room temperatures in 4% sulfuric acid water solution. Electrolysis proceeded for 1 hour with electrode potential 2V higher than water decomposition potential. Once the process was completed, granules were washed with desalted water and air-dried at room temperatures.

To calculate the hydrogen accumulated, granules were placed into a sealed pressure gauge-equipped vial. Granules were heated up to 300° C., following which they were cooled down to room temperatures, with hydrogen pressure measured in the vial. According to the measurements and calculations, 2400 ml hydrogen were released from 1 ml microspheres, which is close to nominal value and matches to 6000 atm hydrogen pressure in granules (see Table 5). This is equivalent to hydrogen weight content of 7.1%.

EXAMPLE 2

A similar test was conducted with 10 μm microspheres made of AT-3 titanium alloy. The hydrogen amount of 1200 ml was released from 1 ml microspheres, which is equivalent to hydrogen weight content of 6.3% w.

EXAMPLE 3

To facilitate hydrogen saturation of the microspheres, the latter were chemically coated with 0.1 μm layer of palladium. Hydrogen saturation was 3-4 times as intensive as in non-coated microspheres.

Figure 4:
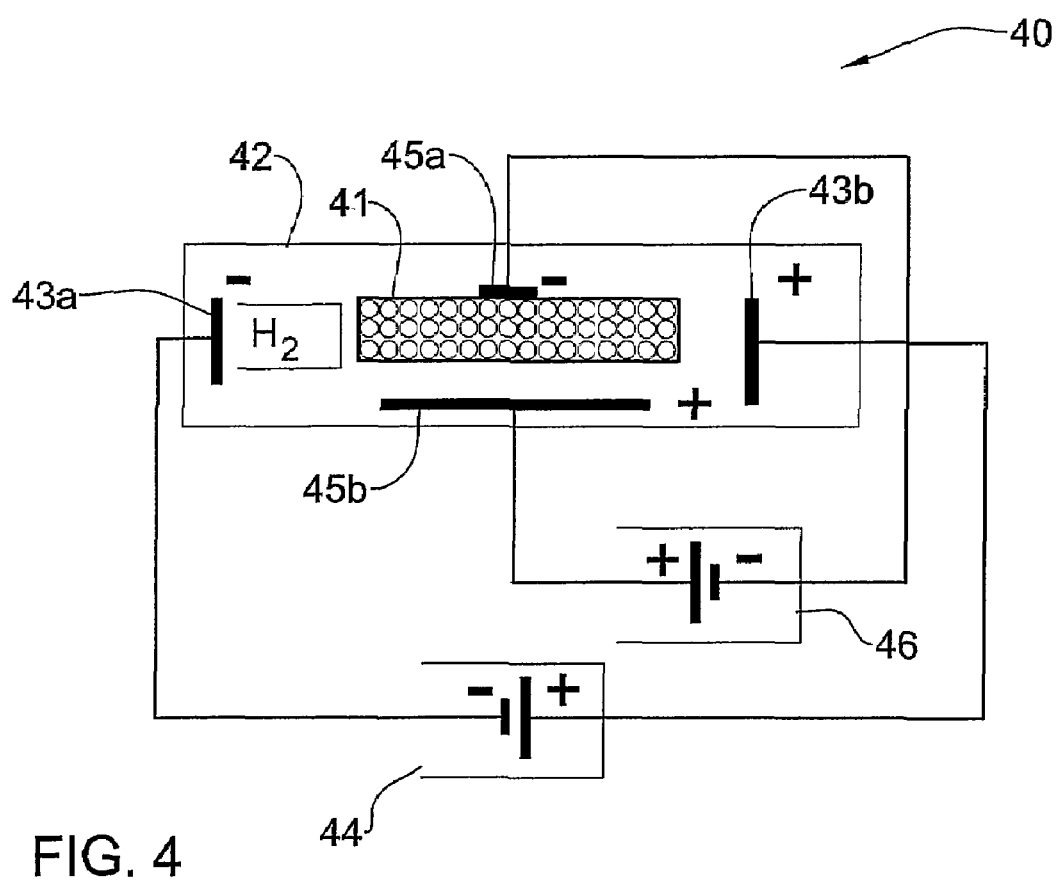
FIG. 4 is a schematic illustration of a system for filing a microspheric material shown in FIGS. 2A-2B with hydrogen by hydrogen ionization in electric discharge.

Referring to FIG. 4, a schematic illustration of a system for filling a microspheric material 41 with hydrogen by hydrogen ionization in electric discharge is illustrated. The microspheric material 41 is placed in a sealed vessel 42 made of electrically non-conductive material, such as glass, plastic, ceramic, etc. The vessel 42 is vacuumed, for example, by a vacuum booster pump to remove air, following which it is fed with hydrogen gas to an excess pressure of about 1-1000 atm. The system 40 includes a first pair of electrodes 43a and 43b arranged in the vessel 42 and coupled to a high voltage source (e.g., 10 kV-20 kV) 44. The electrodes 43a and 43b are configured for providing an electric discharge when the high voltage is applied thereto. The electric discharge will bring about ionization of the hydrogen (potential of hydrogen ionization is 13.6 eV), to wi: $H_2 \rightarrow 2H^+ + 2e^-$.

In order to collect the ionized hydrogen in the microspheres of the material 41, system 40 includes a second pair of electrodes 45a and 45b, coupled to another voltage source 46. A negative potential is applied to the material 41 via the cathode electrode 45a, whereas the anode electrode 45b with a positive potential is located within the vessel 42. It should be understood that the conductive microspheric material 41 by itself can serve as a cathode. When a voltage (e.g. about 50V-100V) is applied across the electrodes 45a and 45b, the hydrogen ions $H^+$ are neutralized on the cathode, to with: $H^+ + e^- \rightarrow H$ and then diffuse to the microspheres through their walls.

EXAMPLE 4

Granules of EI-647 steel 15 μm microspheres were introduced into a methane vial, with 10 kV-20 kV electrode voltage applied across the high voltage electrodes creating dark discharge required to ionize methane molecules. Microspheres were used as cathode, with anode made of graphite (a stand-alone loop). Hydrogen ions were delivered to the cathode (i.e., the microspheres) from the discharge, and filled them with hydrogen gas. The filling lasted for 30 minutes.

To calculate the hydrogen accumulated, microspheres were placed into a sealed pressure gauge-equipped vial, as described above in Example 1, for recovering the hydrogen from the microspheres. It was found that the microspheres volume of 1 ml contained 2,250 ml of hydrogen, which is equivalent to hydrogen pressure in the microspheres of 4500 gauge atm, and 9.2% hydrogen weight content in the microspheres.

Referring to FIG. 2C, a schematic view of a hydrogen accumulation and storage material (13 in FIG. 1) is illustrated, according to yet another embodiment of the present invention. According to this embodiment, an outer surface of the rigid structure of the material is enveloped (coated) by a sealing layer 23, thereby to closing interspherical spaces 24 and improving leak-proofness of the material. For example, the sealing layer 23 can be made of hydrogen absorbing metal selected from at least one of palladium, nickel, lanthanum-nickel alloys. The sealing layer 23 can be formed by any known technique, such as chemical vapor deposition, electroplating, electroless plating, sol gel, plasma-activated chemical vapor deposition, sputtering, and painting. For example, a thickness of the sealing layer 23 can be in the range of about micron to about tens of microns, depending on the microspheres sizes.

In such a structure, hydrogen will fill in the entire space, both inside and between the microspheres. When the structure is hydrogen saturated, hydrogen pressure can increase up to thousands of atmospheres. This is possible because microspheres are made of a high-strength material, and their walls in the rigid structure will be balanced, since hydrogen pressure in and between adjacent microspheres is basically the same, while small peripheral microspheres can withstand high surplus pressure of hydrogen.

Tables 8-10 summarize strength parameters and hydrogen weight content in hydrogen accumulation and storage material formed of various-sized microspheres. In these tables, $\sigma_\phi$ is the tangential stress on a microsphere wall, kg/mm$^2$, $\sigma_R$ is the radial stress on a microsphere wall, kg/mm$^2$.

TABLE 8

(Microspheres having 200 μm diameter and 1 μm wall) Wall weight per 1 liter material is 124.3 g/l; Wall volume in 1 liter material is 0.0155 l/l; hydrogen volume in microspheres is 0.5078 l/l. The Hydrogen content data in the microspheric material are presented for steel microspheres (specific weight of steel is 8 kg/l) and titanium microspheres (specific weight of titanium is 4.5 kg/l), respectively.

| Pressure, gauge atm | Hydrogen content in material with microspheres filled, % w. (g H$_2$/l material). | | | Hydrogen content in material with microspheres and interspace filled, % w. (g H$_2$/l material). | | | $\sigma_\phi - \sigma_R$, kg/mm$^2$ (with microspheres filled) |
|---|---|---|---|---|---|---|---|
| 100 | 4.2 | 7.5 | (5.5) | 6.4 | 11.4 | (8.4) | 50 |
| 150 | 5.7 | 10.2 | (7.1) | 8.7 | 15.5 | (10.8) | 75 |

TABLE 8-continued (Microspheres having 200 μm diameter and 1 μm wall) Wall weight per 1 liter material is 124.3 g/l; Wall volume in 1 liter material is 0.0155 l/l; hydrogen volume in microspheres is 0.5078 l/l; hydrogen volume in and between microspheres is 0.984 l/l. The Hydrogen content data in the microspheric material are presented for steel microspheres (specific weight of steel is 8 kg/l) and titanium microspheres (specific weight of titanium is 4.5 kg/l), respectively.

| Pressure, gauge atm | Hydrogen content in material with microspheres filled, % w. (g $H_2$/l material). | | | Hydrogen content in material with microspheres and interspace filled, % w. (g $H_2$/l material). | | | $\sigma_\phi - \sigma_R$, kg/mm$^2$ (with microspheres filled) |
|---|---|---|---|---|---|---|---|
| 200 | 7.9 | 14.0 | (9.8) | 11.9 | 21.2 | (14.8) | 100 |
| 300 | 10.4 | 18.6 | (13.0) | 15.8 | 28.2 | (19.7) | 151 |
| 400 | 13.1 | 23.2 | (16.2) | 19.8 | 35.2 | (24.6) | 201 |
| 500 | 15.6 | 28.0 | (19.5) | 23.7 | 42.4 | (29.5) | 251 |
| 600 | 16.7 | 29.8 | (20.8) | 25.3 | 45.1 | (31.5) | 301 |
| 700 | 18.8 | 33.5 | (23.4) | 28.5 | 50.7 | (35.4) | 351 |
| 800 | 20.9 | 37.2 | (26.0) | 31.7 | 56.4 | (39.4) | 402 |
| 900 | 23.5 | 41.8 | (29.2) | 35.6 | 63.4 | (44.3) | 452 |
| 1000 | 26.1 | 46.5 | (32.5) | 39.6 | 70.5 | (49.2) | 502 |
| 2000 | 36.6 | 65.1 | (45.5) | 55.4 | 98.7 | (68.9) | 1000 |

TABLE 9

(Microspheres having 100 μm diameter and 1 μm wall) Wall weight per 1 liter material is 0.246 g/l; Wall volume in 1 liter material is 0.031 l/l; hydrogen volume in microspheres is 0.492 l/l; hydrogen volume in and between microspheres is 0.969 l/l. The Hydrogen content data in the microspheric material are presented for steel microspheres (specific weight of steel is 8 kg/l)

| Pressure, gauge Atm | Hydrogen content in material with microspheres filled, % w. (g $H_2$/l material). | | Hydrogen content in material with microspheres and interspace filled, % w. (g $H_2$/l material). | | $\sigma\phi - \sigma_R$, kg/mm$^2$ (with microspheres filled) |
|---|---|---|---|---|---|
| 100 | 2.2 | (5.4) | 3.3 | (8.2) | 29.7 |
| 150 | 3.0 | (7.5) | 4.6 | (11.4) | 37.9 |
| 200 | 3.9 | (9.6) | 5.9 | (14.5) | 50.5 |
| 300 | 5.2 | (12.8) | 7.9 | (19.4) | 76.4 |
| 400 | 6.5 | (16.0) | 9.8 | (24.2) | 101 |
| 500 | 7.8 | (19.2) | 11.8 | (29.1) | 126 |
| 600 | 8.3 | (20.5) | 12.6 | (31.0) | 151 |
| 700 | 9.4 | (23.0) | 14.2 | (34.9) | 177 |
| 800 | 10.4 | (25.6) | 15.8 | (38.8) | 202 |
| 900 | 11.7 | (28.8) | 17.7 | (43.6) | 227 |
| 1000 | 13.0 | (32.0) | 19.7 | (48.5) | 252 |
| 2000 | 18.2 | (44.7) | 27.5 | (67.8) | 505 |

TABLE 10

(Microspheres having 10 μm diameter and 1 μm wall) Wall weight per 1 liter material is 1.3488 g/l; Wall volume in 1 liter material is 0.14186 l/l; hydrogen volume in microspheres is 0.38151 l/l; hydrogen volume in and between microspheres is 0.858135 l/l. The Hydrogen content data in the microspheric material are presented for steel microspheres (specific weight of steel is 8 kg/l) and titanium microspheres (specific weight of titanium is 4.5 kg/l), respectively.

| Pressure, gauge atm | Hydrogen content in material with microspheres filled, % w. (g $H_2$/l material). | | | | Hydrogen content in material with microspheres and interspace filled, % w. (g $H_2$/l material). | | | $\sigma\phi - \sigma_R$, kg/mm$^2$ (with microspheres filled) |
|---|---|---|---|---|---|---|---|---|
| 100 | 0.3 | 0.67 | (4.8) | 0.5 | 1.0 | (7.3) | | 2.5 |
| 150 | 0.5 | 0.8 | (6.2) | 0.7 | 1.2 | (9.4) | | 4.12 |
| 200 | 0.6 | 1.1 | (8.5) | 0.95 | 1.7 | (12.9) | | 5.5 |
| 300 | 0.9 | 1.5 | (11.4) | 1.3 | 2.3 | (17.2) | | 8.25 |
| 400 | 1.1 | 1.9 | (14.2) | 1.6 | 2.8 | (21.5) | | 11.0 |
| 500 | 1.2 | 2.2 | (17.0) | 1.9 | 3.4 | (25.7) | | 13.7 |
| 600 | 1.3 | 2.4 | (18.2) | 2.0 | 3.6 | (27.5) | | 16.5 |
| 700 | 1.5 | 2.7 | (20.4) | 2.3 | 4.1 | (30.9) | | 19.25 |
| 800 | 1.6 | 3.0 | (22.6) | 2.5 | 4.5 | (34.3) | | 22.0 |
| 900 | 1.9 | 3.4 | (25.5) | 2.9 | 5.1 | (38.6) | | 27.0 |
| 1000 | 2.1 | 3.8 | (28.3) | 3.2 | 5.7 | (42.9) | | 27.5 |
| 2000 | 3.0 | 5.2 | (40.0) | 4.5 | 7.9 | (60.1) | | 55.0 |

As can be seen from Table 8, hydrogen weight content of 200 μm rigid microspheric structure at 1000 atm will be 39.6% w. Walls of the microspheres inside the rigid structure are released, because the walls are exposed to the same pressure of 1000 atm from both sides. In the meantime, walls of the peripheral microspheres are exposed to relatively great pressures (i.e., 502.5 kg/mm$^2$).

It should be understood that a wall of the microspheres cannot withstand such pressure and ruptures. To ensure adequate strength properties on the surface of the rigid structure, its edges can, for example, be made of 10 μm microspheres with hydrogen weight content of 6.3% w. (see Table 10). Wall tension of these microspheres at 1000 atm reaches 27.5 kg/mm$^2$, which should withstand a broad range of steel and other materials. Hence, a rigid structure is created having released wall tension of microspheres in the structure bulk, because all walls of the 200 μm and 10 μm microspheres feature the same pressure of 1000 atm, while 10 μm peripheral microspheres are exposed to 27.5 kg/mm$^2$ wall pressure. The presence of small-sized microspheres in the rigid structure can reduce weight content of hydrogen. Accordingly, weight content of hydrogen in rigid structures including 80% of 200 μm microspheres and 20% of 10 μm microspheres will be 34.38% w, when all the microspheres are filled with hydrogen at 1000 atm.

Thus, according to this embodiment of the invention, the rigid microspheric structure is formed so that larger microspheres are located inside the structure (structure bulk), preferably, with the diameter gradually reduced towards the edges. Additionally, an outer surface of this rigid structure is enveloped (coated) by a sealing layer for closing interspherical spaces. This features can allow creation of an accumulation and storage material with high weight content of hydrogen and good strength properties.

It can be appreciated that weight content of hydrogen in titanium microspheres is much higher than that in steel microspheres, because specific weight of titanium is 1.8 times lower (see Tables 8-10). For instance, hydrogen weight content in a rigid structure of 200 μm steel microspheres at 300 atm will be 15.8% w, whereas hydrogen weight content will be 28.2% for titanium microspheres (see Table 8).

Thus, the proposed solution to the problem of providing an accumulation and storage material with high weight content of hydrogen enables creation of accumulators with weight hydrogen much higher than 6%.

Figure 5:
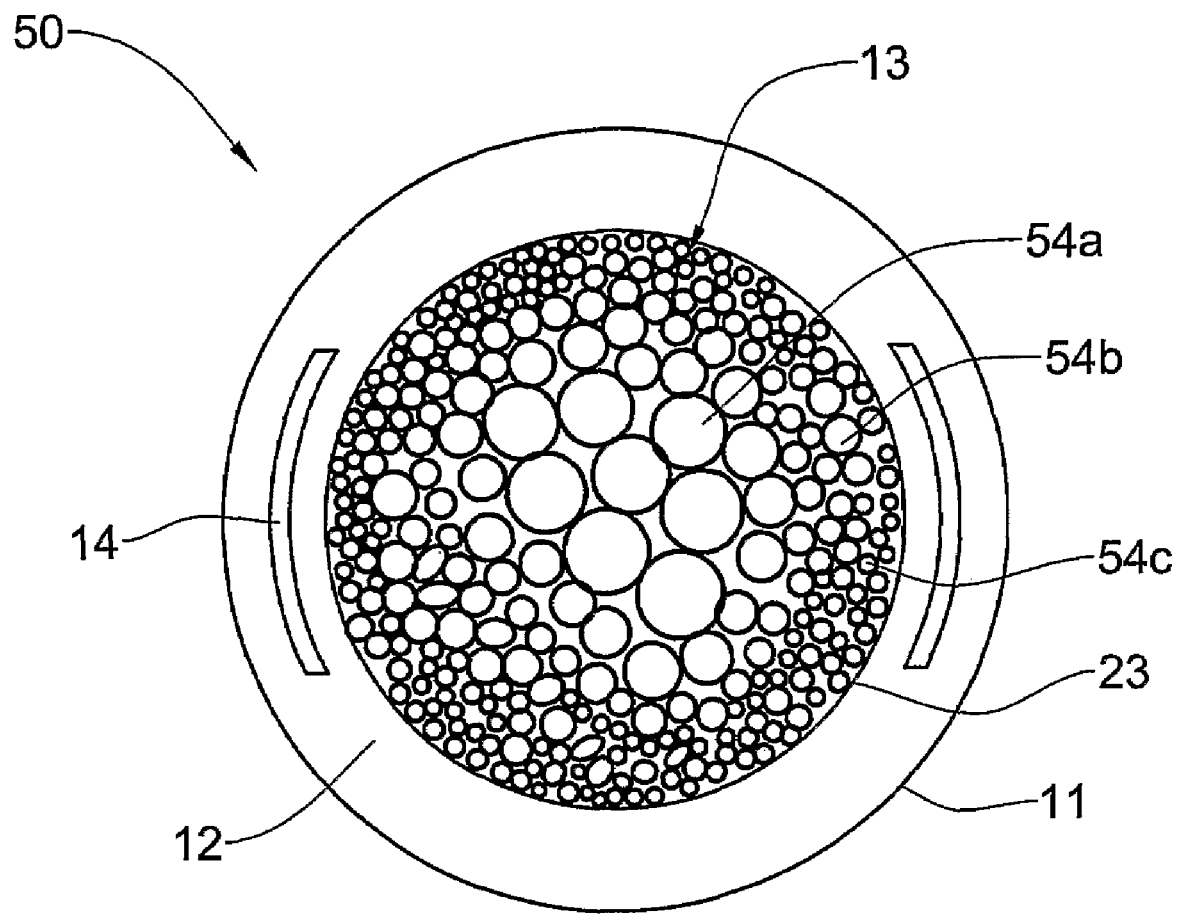
FIG. 5 is a schematic top view of a cross-section of a portion of the tank for accumulation and storage of hydrogen, according to a further embodiment of the present invention.

Referring to FIG. 5, a schematic top view of a cross-section of a portion of the tank 50 for accumulation and storage of hydrogen is illustrated, according to a further embodiment of the present invention. According to this embodiment, the tank 30 utilizes the hydrogen accumulation and storage material 13 shown in FIG. 2C. The rigid microspheric structure of the material includes three zones 54a, 54b, and 54c, each zone containing microspheres of a specific size. The zones 54a, 54b, and 54c are covered by the sealing layer 23.

In practice, the invention can be implemented as follows. The hydrogen accumulation and storage material 13 is made of the three zones 54a, 54b, and 54c of various-sized microspheres having various diameters $D_1$, $D_2$, $D_3$, respectively. For example, $D_1$ can be in the range of 150-200 micrometers $D_2$ can be in the range of 100-150 micrometers, and $D_3$ can be in the range of 50-100 micrometers. The microspheres can be tightly bound, for example, by diffused welding. This creates a uniform rigid structure with the diameter of microspheres reducing from the core zone 54a towards the edges. Afterwards, the outer surface is sealed, e.g., by applying the sealing layer 23 of a hydrogen absorbing metal, such as palladium or nickel or lanthanum-nickel alloy. The thickness of the sealing layer 23 can be in the range of about 5-8 microns.

The hydrogen accumulation and storage material 13 then can be filled with hydrogen gas. To this end, the microspheric material is placed in an autoclave that withstands high pressures and has a heating system. Autoclave is vacuumed by vacuum booster pump to remove air, following which it is fed with hydrogen to a small excess pressure (about 1-10 atm). Afterwards, the autoclave is heated to 300° C.-500° C. (depending on the material of the microspheres), following which an appropriate excess hydrogen pressure is created, which depends on the desired weight content of hydrogen in the rigid structure.

The rigid structure is maintained under these parameters, until hydrogen pressures in the autoclave and inside the rigid structure equalize, due to hydrogen diffusion. Then, the system is cooled down to the room temperature at the same excess pressure. It should be understood that the hydrogen gas should not diff-use from the rigid structure at the room temperature. Thereafter, the hydrogen pressure in the autoclave is dropped, and the rigid structure is removed. Afterwards, hydrogen-containing material 13 is placed in the chamber 12 of the tank 50. Once the internal heat exchanger 14 is activated to maintain the temperature in the range of 250° C.-350° C., hydrogen will start to release from the material 13 to the chamber 12, and when required, the hydrogen gas can be discharged from the tank.

It should be understood that when required the tank 50 itself can be placed in an autoclave for filling the microspheric material. In such a case, the outlet pipe of the tank should be opened in order provide access of the hydrogen gas to the material 13.

It should be noted that although the tank 50 having three zones formed of various-sized microspheres is shown in FIG. 5, generally the number of the zones can be of any desired value.

The essence of the present invention can be better understood from the following non-limiting specific Examples 5 to 7 of the microspheric material for accumulation and storage of hydrogen gas. These examples are intended to illustrate the present invention and to teach a person of the art how to make and use the invention. It should be understood that these examples are not intended to limit the scope of the invention or its protection in any way.

EXAMPLE 5

200 μm steel microspheres are placed into a quartz cylinder (having 11 mm diameter and 8.0 cm height) and bound together by diffused welding. Then, the microspheric cylinder so obtained was put inside a 13 mm quartz cylinder, with 1 mm layer of 100 μm microspheres on the bottom. Thereafter, the 100 μm microspheres were placed between the walls of the quartz cylinder and the 200 μm microspheric cylinder. The same layer of 100 μm microspheres was placed on the top of the 200 μm microspheric cylinder, all followed by diffused welding. Hence, a rigid microspheric structure was formed. This rigid microspheric cylinder weighs 1.541 g. This value is in a good agreement with the calculated weigh value, which is 1.48 g. The structure was filled with hydrogen gas in the autoclave, as described above, at 150 gauge atm hydrogen pressure and 450° C. To ensure an adequate hydrogen saturation of the rigid structure, the procedure lasted for 2 hours. Hydrogen-filled rigid structure weighs 1.677 g. In other words, the hydrogen content in the structure is 0.136 g, which is equivalent to 8.1% w. This value is in a good agreement with the calculated value, which is 8.68% w.

EXAMPLE 6

A bulk of the rigid structure including microspheres with 100 μm diameter and 1 μm wall thickness has been created by diffused welding of the microspheres. The outer layer of the rigid structure has been formed of 5 μm microspheres. The structure was filled with hydrogen in a vial at 300° C. and 1,000 gauge atm pressure for 2.5 hours. Then, the temperature was dropped down to 20° C. at the same surplus hydrogen pressure. The structure weights before and after hydrogen saturation were 1.24 g and 1.42 g, respectively, i.e., the weight content of hydrogen in the structure reached 12.7% w.

EXAMPLE 7

A similar rigid structure was coated with a layer of nickel to seal the entire structure. The sealing layer was about 5-8 μm thick. Afterwards, the structure was filled with hydrogen, as described in Example 5. In this case, the weight content of hydrogen reached 18.6%.

Hence, the proposed hydrogen storage apparatus will allow a safe storage of hydrogen, while its content in the tank enables use as fuel for vehicles, and for other industries.

The tank of the present invention can be used as an interchangeable cartridge. For example, an interchangeable cartridge having the following technical parameters can be implemented. The length of a cylindrical housing—1.0 m; the radius of the housing—25 mm; the inner volume—1.66 liters; total volume—2.0 liters; the ratio of the housing wall to the radius of the housing—0.05; the weight of the interchangeable cartridge (loaded with hydrogen accumulation and storage material)—0.714 kg. Such an interchangeable cartridge can be placed in containers. For example, 16 interchangeable cartridges can be placed in one container having size dimensions of 200×200 mm and length dimension of 1000 mm. The calculations show that 3 such containers can contain between 4.3 kg to 6.36 kg of hydrogen at 350 atm that can be supplied to required device of consumer.

Table 11 illustrates exemplary calculated parameters of the interchangeable cartridge of the above example.

be utilized as a basis for the designing of other structures systems and processes for carrying out the several purposes of the present invention.

It is to be understood that the phraseology and terminology, employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims.

The invention claimed is:

1. A hydrogen accumulation and storage material comprising a plurality of various-sized and at least partially permeable to hydrogen microspheres bound together to form a rigid structure in which a diameter of the microspheres is reduced from a center of the structure towards edges of the structure.

2. The material of claim 1 wherein the diameter of the microspheres is in the range of 5 microns to 5000 microns.

3. The material of claim 1 wherein the ratio of the wall thickness of the microspheres to their diameter is less than or equal to 0.5.

4. The material of claim 1 wherein said rigid structure is made of a plurality of zones, each zone including microspheres having predetermined size.

5. The material of claim 1 wherein the permeability is controllably altered by at least one of pressure and temperature.

6. The material of claim 1 wherein the microspheres are made of electrically conductive material.

7. The material of claim 1 wherein the material of the microspheres is selected from at least one of graphite, graphite-based composites, steel, titanium, lanthanum, nickel, zirconium, alloys thereof.

TABLE 11

| $H_2$ pressure in the cartridge, atm | $H_2$ weight in the interspheres space, g | Tension of the cartridge wall, kg/mm$^2$ | $H_2$ pressure in the microspheres, atm | $H_2$ weight in the microspheres, g | Tension in the microspheres' walls, kg/mm$^2$ | Total $H_2$ weight, g. | % weight. $H_2$, | $H_2$ weight content in the cartridge, g/l |
|---|---|---|---|---|---|---|---|---|
| 350 | 10.2 | 35.9 | 1000 | 53.0 | 97.5 | 63.2 | 8.9 | 31.6 |
| 350 | 10.2 | 35.9 | 2000 | 79.4 | 205 | 89.7 | 12.6 | 44.8 |
| 350 | 10.2 | 35.9 | 3000 | 95.3 | 302 | 105 | 14.8 | 52.8 |
| 350 | 10.2 | 35.9 | 4500 | 106 | 461 | 116 | 16.3 | 58.1 |
| 1000 | 20.4 | 97.5 | 1000 | 53.0 | 97.5 | 73.4 | 10.3 | 36.7 |
| 1000 | 20.4 | 97.5 | 2000 | 79.4 | 205 | 99.8 | 14.0 | 50.0 |
| 1000 | 20.4 | 97.5 | 3000 | 95.3 | 302 | 115 | 16.2 | 57.8 |
| 2000 | 28.6 | 205 | 2000 | 79.4 | 205 | 108 | 15.1 | 54.0 |
| 2000 | 28.6 | 205 | 3000 | 95.3 | 302 | 123 | 17.4 | 62.0 |
| 3000 | 36.8 | 302 | 3000 | 95.3 | 302 | 132 | 18.5 | 66.1 |

As can be seen from Table 11, even when the pressure in the cartridge is 350 atm, the hydrogen weight content is higher than 6%.

As such, those skilled in the art to which the present invention pertains, can appreciate that while the present invention has been described in terms of preferred embodiments, the conception, upon which this disclosure is based, may readily 8. The material of claim 1 wherein the microspheres are bound together by at least one process selected from welding or sintering.

9. The material of claim 1 wherein an outer surface of the microspheres is at least partially coated with a hydrogen absorbing layer.

10. The material of claim 9 wherein said hydrogen absorbing layer is made of electrically conductive material.

11. The material of claim 9 wherein the hydrogen absorbing layer is made of a metal selected from at least one of palladium, nickel, lanthanum-nickel alloys.

12. The material of claim 9 wherein the coating is formed by at least one coating process selected from chemical vapor deposition, electroplating, electroless plating, sol gel, plasma-activated chemical vapor deposition, sputtering, and painting.

13. The material of claim 1 wherein an outer surface of said rigid structure is enveloped by a sealing layer, thereby to close interspherical spaces.

14. The material of claim 13 wherein hydrogen pressure within the microspheres is higher than the hydrogen pressure in the interspherical spaces.

15. The material of claim 13 wherein said sealing layer is made of a hydrogen absorbing metal selected from at least one of palladium, nickel, lanthanum-nickel alloys.

16. The material of claim 13 wherein said sealing layer is made of a hydrogen absorbing metal selected from at least one of palladium, nickel, lanthanum-nickel alloys.

17. The material of claim 1 wherein a pressure of the hydrogen stored within the microspheres is better than 1000 atm.

18. A tank for accumulation and storage of hydrogen comprising:
    a sealed housing defining a chamber;
    a hydrogen accumulation and storage material arranged within the chamber, the material comprising a plurality of various-sized and at least partially permeable to hydrogen microspheres bound together to form a rigid structure in which a diameter of the microspheres is reduced from a center of the structure towards edges of the structure; and
    an activator configured for control of diffusion rate of hydrogen permeability of said storage material.

19. The tank of claim 18, wherein said activator is in the form of an internal heat exchanger configured for controllably varying the temperature of said hydrogen accumulation and storage material, thereby providing a controllable release of the hydrogen stored within the material into a volume of the chamber that is not occupied by the material.

20. The tank of claim 19 wherein a pressure of the hydrogen stored within the volume can be in the range of 0.5 MPa to 1 MPa.

21. The tank of claim 19 comprising an outlet pipe having a valve for controllable discharge of the hydrogen from the chamber.

22. The tank of claim 19 wherein said internal heat exchanger includes an electrically heating element.

23. The tank of claim 19 wherein said internal heat exchanger includes a pair of electrodes configured for coupling the material to an electric power source.

24. The tank of claim 19 wherein said internal heat exchanger includes a system of heat conductive pipes through which a flow of a fluid having a predetermined temperature can be provided.

25. A method of forming a hydrogen accumulation and storage material, comprising:
    providing a plurality of various-sized and at least partially permeable to hydrogen microspheres;
    arranging the microspheres such that a structure is formed in which a diameter of the microspheres is reduced from a center of the structure towards edges of the structure;
    binding the microspheres together to make the structure rigid.

26. The method of claim 25 wherein said binding of the microspheres includes at least one process selected from welding or sintering.

27. The method of claim 25 comprising the step of coating the microspheres with a hydrogen absorbing layer before said arranging of the microspheres.

28. The method of claim 27 wherein said hydrogen absorbing layer is made of electrically conductive material.

29. The method of claim 27 wherein the hydrogen absorbing layer is made of a metal selected from at least one of palladium, nickel, lanthanum-nickel alloys.

30. The method of claim 27 wherein the coating of the microspheres includes at least one coating process selected from chemical vapor deposition, electroplating, electroless plating, sol gel, plasma-activated chemical vapor deposition, sputtering, and painting.

31. The method of claim 27 comprising the step of enveloping an outer surface of said rigid structure by a sealing layer, thereby to close interspherical spaces.

32. A method of filling a hydrogen accumulation and storage material of claim 1 with hydrogen, comprising:
    placing the material in hydrogen-containing medium;
    transforming hydrogen in ionic form;
    providing a motion of the ionic hydrogen towards the material by an electric field.

33. The method of claim 32 wherein said transforming of the hydrogen in ionic form is carried out by an electrolysis process in water solutions.

34. The method of claim 32 wherein said transforming of the hydrogen in ionic form is carried out by an electric discharge process.

* * * * *